United States Patent
Adams et al.

(10) Patent No.: US 6,449,341 B1
(45) Date of Patent: Sep. 10, 2002

(54) APPARATUS AND METHOD FOR MANAGING A SOFTWARE SYSTEM VIA ANALYSIS OF CALL CENTER TROUBLE TICKETS

(75) Inventors: Mark Adams, Alpharetta; Don R. Bridges, Peachtree City; Marty Holmes, Suwanee; Ken Lockie, Alpharetta, all of GA (US)

(73) Assignee: MCI Communications Corporation, Washington, DC (US)

( * ) Notice: Subject to any disclaimer, the term of this patent is extended or adjusted under 35 U.S.C. 154(b) by 0 days.

(21) Appl. No.: 09/139,466

(22) Filed: Aug. 25, 1998

(51) Int. Cl.[7] .......................... H04M 1/24; H04M 3/08; H04M 3/22
(52) U.S. Cl. .................. 379/9; 379/1.01; 379/9.01; 379/9.03; 379/10.01; 379/15.01; 702/179; 702/183
(58) Field of Search .................... 379/1, 9, 10, 15, 379/32, 34, 112, 13, 201, 133, 207, 242, 9.01, 9.03, 9.04, 15.01; 702/127, 179, 183, 184

(56) References Cited

U.S. PATENT DOCUMENTS

| | | | | |
|---|---|---|---|---|
| 4,972,453 A | * | 11/1990 | Daniel, III et al. ........... 379/10 |
| 5,276,529 A | * | 1/1994 | Williams ..................... 358/406 |
| 5,297,193 A | * | 3/1994 | Bouix et al. ................... 379/32 |
| 5,566,291 A | * | 10/1996 | Boulton et al. ............. 345/326 |
| 5,847,972 A | * | 12/1998 | Eick et al. ..................... 709/246 |
| 5,903,453 A | * | 5/1999 | Stoddard, II ................. 364/184 |
| 5,930,333 A | * | 7/1999 | Jabbarnezhad ................ 379/14 |
| 6,064,381 A | * | 5/2000 | Harel .......................... 345/333 |

* cited by examiner

Primary Examiner—Binh Tieu

(57) ABSTRACT

An apparatus and method for managing a software system based on analysis of call center trouble ticket data. The apparatus and method include and involve a data storage subsystem that has a database for storing data related to call center trouble tickets which are generated in response to corresponding trouble reports related to a software system. Also included and involved is a processor that is coupled to the data storage subsystem and which is operative to process the data stored in the database by producing statistics related to the software system and particular subsystems thereof, and to store the generated statistics in the data storage subsystem. The apparatus and method also include and involve an output subsystem that is coupled to the processor and to the data storage system and which is operative to automatically retrieve the statistics from the data storage subsystem to generate at least one report based on the statistics.

23 Claims, 12 Drawing Sheets

```
                                                        ┌200
┌──────────────────────────────────────────────────────┐
│ Trouble Ticket # : OH00076747                        │
│ Severity : 3                                         │
│ Call Type : MCI:RE/IMAGE                             │
│ Resolution Code : XX                                 │
│ Short Description : Request for Rescue Kit from SA (INFO REQUEST) │
│ Event Log :                                          │
│       AUG 5, 1997 10:09:40 AM  bmccarthy             │
│       Greg SA on site ( chi517s001)                  │
│       Rescue Kit Mark Bolinski has requested a Kit for one of his │
│                                                      │
│       people Gary Auxier ( who travels extensively ) │
│                                                      │
│       Severity of: 3                                 │
│                                                      │
│       Problem Assigned To: OOC-MCI-EHD  Notified By: Phone │
│                                                      │
│       AUG 10, 1997 10:10:56 AM  bmccarthy            │
│       Problem Assigned To:  OOC-MCI-LAN  Notified By:  None │
│                                                      │
│       AUG 10, 1997 3:00:49 PM  whytecl               │
│       Spoke with Rob, we can send this user a Rescue Kit │
│       will confirm with Susan Mascour                │
│       called S/A for shipping info                   │
│       left message                                   │
│                                                      │
│ Status Changed to:  Monitor                          │
│                                                      │
└──────────────────────────────────────────────────────┘
```

| | | Name of Product: | SecureID |
|---|---|---|---|
| | | Number of Users: | 6000 |
| | | Earliest Date of data (mm/dd/yy): | Fri, 08/01/97 |
| | | Latest Date of data (mm/dd/yy): | Mon, 09/01/97 |

[Clear All] [Clear #]

Messages....
Enter data into peach colored cells, then hit Sort & Update button.

V 1.0

Enter categories in the range below. Don't skip any rows. Sort data when done.

[Sort & Update]

| Category Name | Total Calls for Month | Mon 07/28 | Tue 07/29 | Wed 07/30 | Thu 07/31 | Fri 08/01 | Mon 08/04 | Tue 08/05 | Wed 08/06 | Thu 08/07 | Fri 08/08 | Mon 08/11 | Tue 08/12 | Wed 08/13 | Thu 08/14 | Fri 08/15 |
|---|---|---|---|---|---|---|---|---|---|---|---|---|---|---|---|---|
| Info Request | 121 | | | | | | 8 | 6 | 6 | 8 | 5 | 9 | 3 | 7 | 4 | 6 |
| Connectivity | 72 | | | | | | 7 | 2 | 4 | 2 | 3 | 8 | 7 | 4 | 5 | 3 |
| Training | 51 | | | | | | 4 | 3 | 2 | 2 | 1 | | 1 | 1 | 1 | 2 |
| New Request | 21 | | | | | | 2 | 2 | 1 | 1 | | 3 | | 1 | | 1 |
| Other | 20 | | | | | | 5 | 1 | | 1 | | | 3 | | | 1 |
| | | | | | | | | | | | | | | | | |
| Total Weekday Tickets: | 285 | 0 | 0 | 0 | 0 | 0 | 26 | 14 | 15 | 14 | 9 | 20 | 14 | 13 | 10 | 13 |
| check sum: | 285 | | | | | | | | | | | | | | | |
| Month of Report: | August 1997 | | | | | | | | | | | | | | | |

FIG. 4B

| Name of Product: | SecureID | | | | | | | | | | | | | | | | | | | |
|---|---|---|---|---|---|---|---|---|---|---|---|---|---|---|---|---|---|---|---|---|
| Number of Users: | 6000 | | | | | | | | | | | | | | | | | | | |
| Earliest Date of data (mm/dd/yy): | Fri, 08/01/97 | | | | | | | | | | | | | | | | | | | |
| Latest Date of data (mm/dd/yy): | Mon, 09/01/97 | | | | | | | | | | | | | | | | | | | |

Enter categories in the range below. Don't skip any rows. Sort data when done.  — 402

| Category Name | Sort & Update | Total Calls for Month | Mon 08/18 | Tue 08/19 | Wed 08/20 | Thu 08/21 | Fri 08/22 | Mon 08/25 | Tue 08/26 | Wed 08/27 | Thu 08/28 | Fri 08/29 | Mon 09/01 | Tue 09/02 | Wed 09/03 | Thu 09/04 | Fri 09/05 |
|---|---|---|---|---|---|---|---|---|---|---|---|---|---|---|---|---|---|
| Info Request | | 121 | 8 | 6 | 2 | 4 | 5 | 6 | 7 | 8 | 6 | 7 | | | | | |
| Connectivity | | 72 | 6 | 4 | 3 | 2 | 5 | | 1 | 2 | 2 | 2 | | | | | |
| Training | | 51 | 4 | 2 | 5 | 4 | 4 | 6 | 4 | 4 | | 2 | | | | | |
| New Request | | 21 | 2 | | | 1 | | | 1 | 1 | 1 | 1 | | | | | |
| Other | | 20 | | 3 | 1 | | 2 | 2 | | | | | | | | | |
| | | | | | | | | | | | | | | | | | |
| Total Weekday Tickets: | | 285 | 20 | 15 | 11 | 11 | 16 | 14 | 13 | 16 | 9 | 12 | 0 | 0 | 0 | 0 | 0 |
| check sum: | | 285 | | | | | | | | | | | | | | | |
| Month of Report: | August 1997 | | | | | | | | | | | | | | | | |

404 — (Info Request through Other rows)
406 — Total Weekday Tickets row
408 — check sum row

FIG. 5

| MONTH | August 1997 | | Info Request | Connectivity | Training | New Request | Other | Application: # of Users: | DATA SUMMARY SecureID 6000 | UCL= 31.25 LCL= 5.52 |
|---|---|---|---|---|---|---|---|---|---|---|
| Day | # of Calls | % of Users | | | | | | | | |
| 07/28 | --- | | | | | | | | | |
| 07/29 | --- | | | | | | | | | |
| 07/30 | --- | | | | | | | | | |
| 07/31 | --- | | | | | | | | | |
| 08/01 | --- | | | | | | | | | |
| 08/04 | 26 | 0.43% | 8 | 7 | 4 | 2 | 5 | | | |
| 08/05 | 14 | 0.23% | 6 | 2 | 3 | 2 | 1 | | | |
| 08/06 | 15 | 0.25% | 6 | 4 | 2 | 2 | 1 | | | |
| 08/07 | 14 | 0.23% | 8 | 4 | 2 | 1 | 1 | | | |
| 08/08 | 9 | 0.15% | 5 | 2 | 1 | | | | | |
| 08/11 | 20 | 0.33% | 9 | 3 | 1 | 3 | 3 | | | |
| 08/12 | 14 | 0.23% | 3 | 8 | 1 | | 1 | | | |
| 08/13 | 13 | 0.22% | 7 | 7 | 1 | | | | | |
| 08/14 | 10 | 0.17% | 4 | 4 | | 1 | 1 | | | |
| 08/15 | 13 | 0.22% | 6 | 5 | 2 | 1 | | | | |
| 08/18 | 20 | 0.33% | 8 | 3 | 4 | 1 | 3 | | | |
| 08/19 | 15 | 0.25% | 6 | 6 | 2 | 2 | | | | |
| 08/20 | 11 | 0.18% | 2 | 4 | 5 | | | | | |
| 08/21 | 11 | 0.18% | 4 | 3 | 4 | | | | | |
| 08/22 | 16 | 0.27% | 5 | 2 | 4 | 2 | 2 | | | |
| 08/25 | 14 | 0.23% | 6 | 5 | 6 | 1 | | | | |
| 08/26 | 13 | 0.22% | 7 | 1 | 4 | 1 | 1 | | | |
| 08/27 | 16 | 0.27% | 8 | 2 | 4 | 1 | | | | |
| 08/28 | 9 | 0.15% | 6 | 2 | | 1 | | | | |
| 08/29 | 12 | 0.20% | 7 | 2 | 2 | 1 | | | | |
| 09/01 | --- | | | | | | | | | |
| 09/02 | --- | | | | | | | | | |
| 09/03 | --- | | | | | | | | | |
| 09/04 | --- | | | | | | | | | |
| 09/05 | --- | | | | | | | | | |
| Totals | 285 | 5% | 121 | 72 | 51 | 21 | 20 | | | |
| Average | 18.39 | | 42% | 25% | 18% | 7% | 7% | | | |

APPARATUS AND METHOD FOR MANAGING A SOFTWARE SYSTEM VIA ANALYSIS OF CALL CENTER TROUBLE TICKETS

BACKGROUND OF THE INVENTION

1. Field of the Invention

The present invention relates to call centers and, more particularly, to the data collected and processed by call centers that support computer software systems and applications.

2. Description of the Related Art

The use of telephone call service centers such as customer support centers to support computer software applications and systems is well known. Many companies have utilized call centers to support the use of computer software applications and systems by internal employee populations. Other companies have established live-operator call centers to support commercial software products and related services. For example, telephone service companies such as long distance telephone service companies utilize live-operator attended call centers to answer product and service questions, respond to customer account inquiries, provide technical support and help-desk services, and to otherwise respond to customer needs.

Typically, a live-operator call center, such as one that, supports customers who have computer software problems (e.g., a help-desk call center), responds to callers by preparing a trouble report for each call. In particular, the nature of each support call handled by a call center is recorded in a "trouble ticket." A trouble ticket is completed by a call center attendant and often includes data related to a reported problem, the time and date of the call, the caller's name, a set of notes related to the reported problem, a planned course of response, and, possibly, a host of other trouble-related information. After a trouble ticket is completed, it may be: routed for further handling and processing to complete a satisfactory response to a reported problem; stored in an archive in the event that a satisfactory response was performed to respond to the reported problem; or handled in some other way dictated by a particular business process (e.g., delivered to a customer satisfaction group within an organization, etc.). Usually, trouble tickets are stored in a database managed by a call center.

Although stored trouble ticket data is often used to derive certain demographic and basic statistical information, such data often is underutilized. For example, call center trouble ticket data often is used to drive queries and reports about caller attributes, product usage statistics, etc. Unfortunately, there exists no way to take advantage of the data stored in a call center trouble ticket database to drive queries and reports, for example, that may be used to affect or otherwise manage and control the specific attributes or sub-systems of a particular software application. As such, companies involved in development and/or use of a software application or system are left to trial and error in terms of fixing software problems and correcting underlying causes of system problems and failures. As a result, companies often release or use software applications and systems that contain problems that are not accurately tracked. And, as there is no way to accurately determine the cause of software system problems, companies and call centers often have to employ and deploy additional and costly resources (including additional personnel) to handle what otherwise may be fixable problems.

Thus, there exists a need to provide an improved apparatus and method for managing a software system via analysis of call center trouble ticket data. To be viable, such an apparatus and method must allow trouble ticket data to drive statistical analyses in regard to particular software application modules and subsystems. Such an apparatus and method must be user-friendly and must produce reports and other outputs that identify particular software application problem areas. Such reports and outputs must be suited to form part of a plan to positively affect the refinement and/or lifecycle of a particular software application or system.

SUMMARY OF THE INVENTION

The present invention solves the aforementioned problems associated with managing or otherwise affecting the lifecycle of a software system or application by providing an apparatus and a method that automatically analyze call center trouble ticket data. Such analysis includes, but is not limited to, calculating relative call volumes for particular subsystems of a software system or application. As a result of such analysis, outputs including reports and graphical charts are generated. Such reports may be used by planning personnel to establish and monitor business processes aimed at correcting software problems, managing call center resources, and affecting the lifecycle of a software system.

By providing such an apparatus and method the present invention also provides certain benefits. For example, by analyzing call center trouble ticket data related to particular subsystems of a larger software system or application, those responsible for software system support and maintenance can now be informed as to particular problem areas. As such, those entities responsible for operating call centers may now allocate resources including support personnel to handle trouble calls. Also, software manufacturers will be able to isolate particular problems areas to better allocate technical personnel to fix or otherwise manage software problems, bugs, and defects. And, as the present invention produces outputs that are user-friendly and easy to understand, business personnel will be able to better control resource allocation and, ultimately, costs associated with supporting and controlling the lifecycle of a particular software system or application.

The present invention achieves the above-described benefits by providing an apparatus and method for managing a software system that include and involve a data storage subsystem that has a database for storing data related to call center trouble tickets which are generated in response to corresponding trouble reports related to a software system. Additionally, the apparatus and method include and involve a processor that is coupled to the data storage subsystem and which is operative to process the data stored in the database by producing statistics related to the software system and particular subsystems thereof, and to store the generated statistics in the data storage subsystem. And, the apparatus and method include and involve an output subsystem that is coupled to the processor and to the data storage system and which is operative to automatically retrieve the statistics from the data storage subsystem to generate at least one report based on the statistics.

BRIEF DESCRIPTION OF THE DRAWINGS

The present invention is described in detail below with reference to the following drawing figures, of which:

FIG. 2 is an exemplary call center trouble ticket that is used to form the basis of a call tracking database according to a preferred embodiment of the present invention;

FIG. 4A is a preferred embodiment of an automated spreadsheet used to perform call center trouble ticket data analysis to manage a software system according to the present invention;

FIG. 4B is the second half of the automated spreadsheet depicted in FIG. 4A;

FIG. 5 is an automated spreadsheet that is automatically generated based on the automated spreadsheet depicted in FIGS. 4A and 4B;

DETAILED DESCRIPTION OF THE PREFERRED EMBODIMENTS

Figure 1:
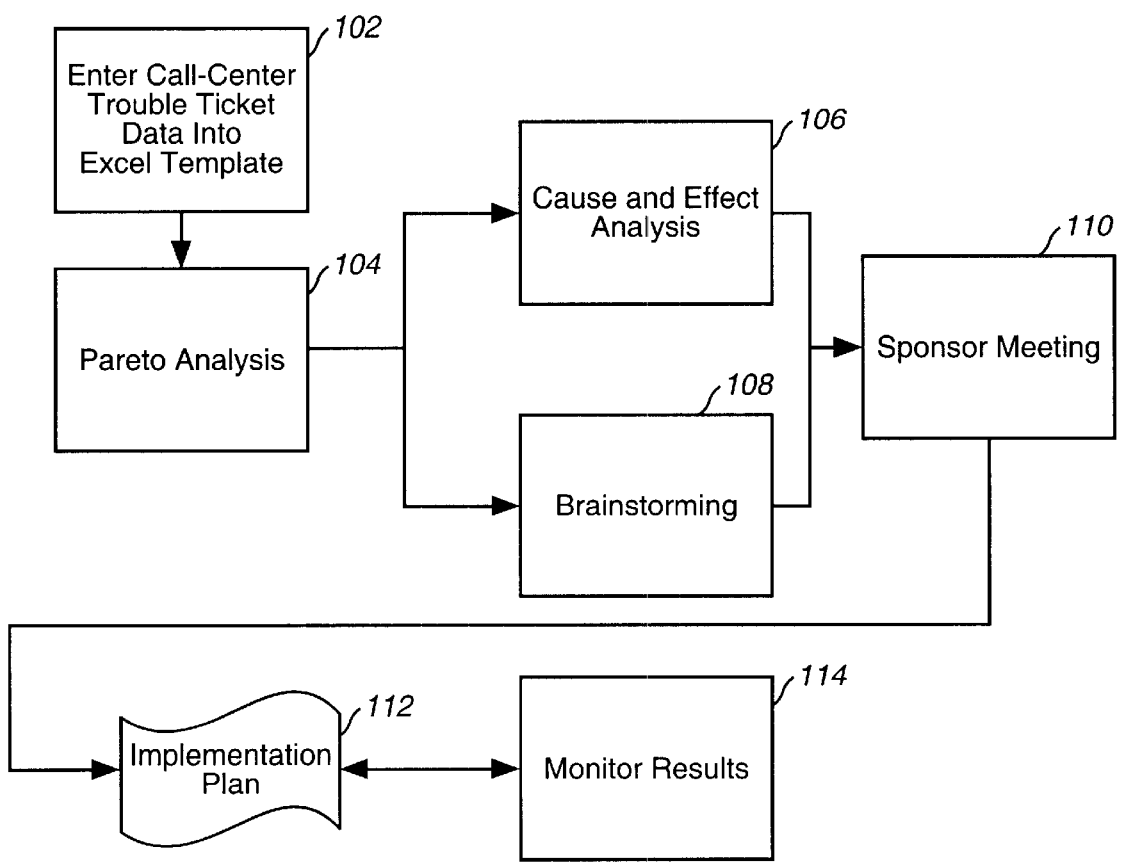
FIG. 1 is a diagram that illustrates the structures and processes performed within a preferred embodiment of the present invention to manage a software system via analysis of call center trouble ticket data.

The present invention is now discussed in detail with regard to the drawing figures that were briefly described above. An OVERVIEW section, in which the structures and processes utilized within the present invention are illustrated and explained, is followed by corresponding STRUCTURAL and OPERATIONAL ASPECTS OF THE PRESENT INVENTION sections. Unless otherwise indicated, like parts and processes are referred to with like reference numerals.

Overview

The novel aspects of the present invention are illustrated and described with regard to FIG. 1 to which reference is now made. FIG. 1 depicts a block diagram that illustrates the structures used and processes performed within a preferred embodiment of the present invention to manage or otherwise affect the lifecycle of a software system via analysis of call center trouble ticket data. Call center trouble tickets and data related to a particular software system or subsystem thereof may be collected and submitted to and processed by a data analysis tool that will allow statistical analysis in accordance with the present invention. Such a tool may be implemented in a spreadsheet software application such as the MICROSOFT EXCEL spreadsheet application which is manufactured and marketed by MICROSOFT CORPORATION. Such a tool is further described below with regard to FIGS. 4A, 4B, and 5. MICROSOFT and EXCEL are registered trademarks of MICROSOFT CORPORATION. In any case, data may be collected and prepared for analysis at block 102. Exemplary structures that may be deployed and processed as indicated at block 102 are discussed below with regard to FIGS. 2A, 2B, and 3A. The operational aspects related to such structures are discussed below with regard to FIG. 3B.

At block 104, data analysis including, but not limited to, mathematical averaging and Pareto analyses may be performed in relation to call center trouble ticket data gathered by structures and processes identified at block 102. Such analyses may be used to drive reports and other outputs (e.g., graphical charts, etc.) to assist in management of a software system or application according to the present invention. The types of analyses that may be performed within the context of the present invention are discussed below with regard to FIGS. 4A, 4B, 5, 6, 7, and 8.

In any case, analysis results generated in accordance with the present invention may be passed through business processes to determine causes and effects of software system problems. Brainstorming processes then may be carried out to develop action plans to correct and refine a particular software system or subsystem thereof as indicated at blocks 106 and 108, respectively. The causes for system problems will be clear as a result of the analysis outputs generated by structures indicated at block 104. Accordingly, at block 110, a software system sponsor (e.g., vendor, management entity, etc.) may be consulted about the results of the data analysis. And, as a result of such consultation, an implementation/action plan may be developed and deployed as indicated at block 112 to correct and/or refine a monitored software system.

Results and progress related to the implantation/action plan may be monitored to determine if problems are adequately addressed, as indicated at block 114.

As such, by collecting and analyzing call center trouble ticket data in accordance with the present invention, a software system or application may be managed and refined so that reported problems are fixed and/or managed. If problems are fixed and/or managed effectively, software systems will run better and more reliably. And, by fixing or otherwise addressing problems, a software system or application may be refined to the point that fewer call center resources are needed for support, thus reducing costs associated with call center operations. Through analysis of call center trouble ticket data related to particular software problems, entities responsible for development and/or maintenance and monitoring will be better able to control and manage software system lifecycles and the like.

Structural Aspects of the Present Invention

Figure 3A:
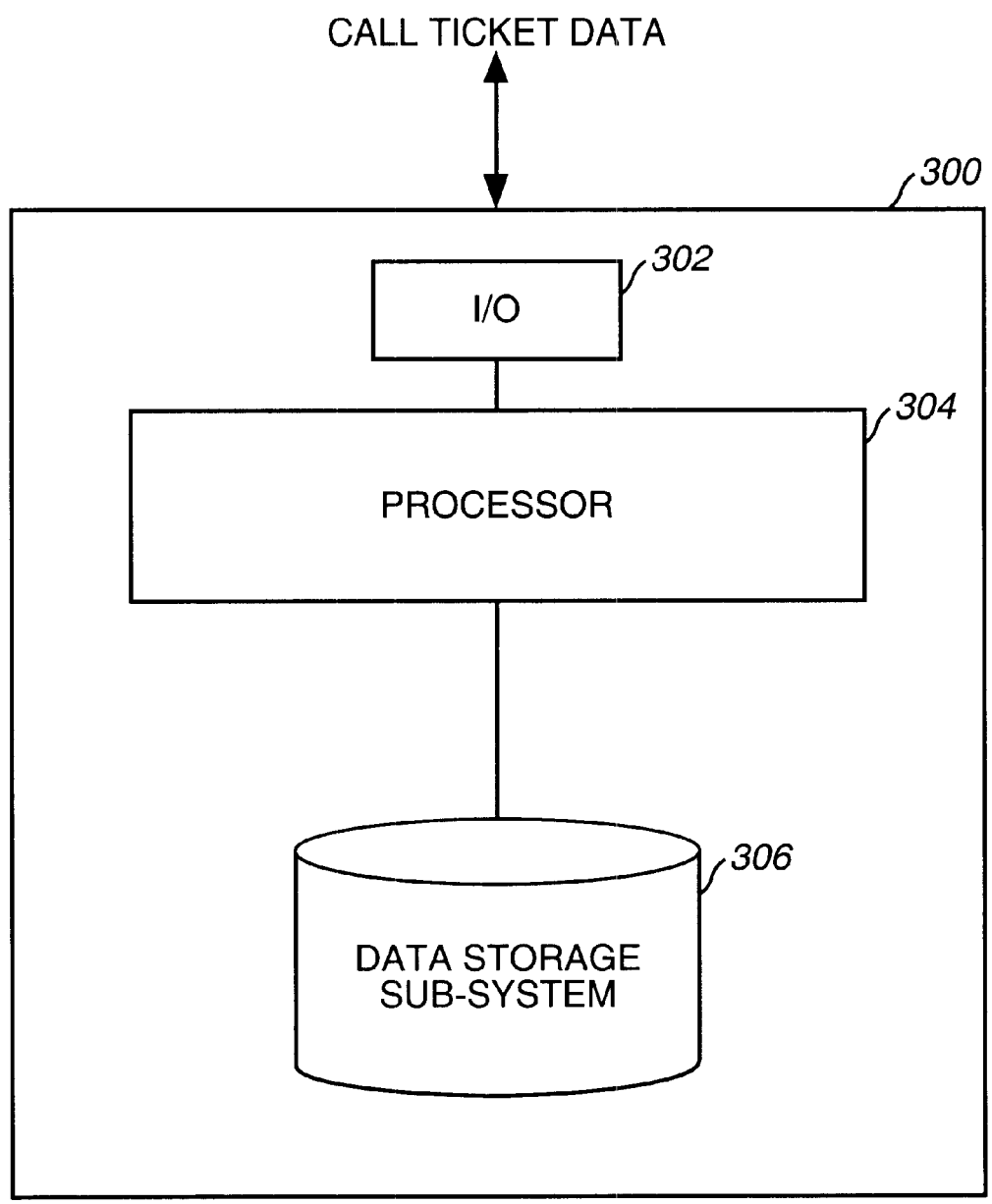
FIG. 3A is a block diagram of a computing platform configured to perform call center trouble ticket data analysis according to a preferred embodiment of the present invention.
Figure 3B:
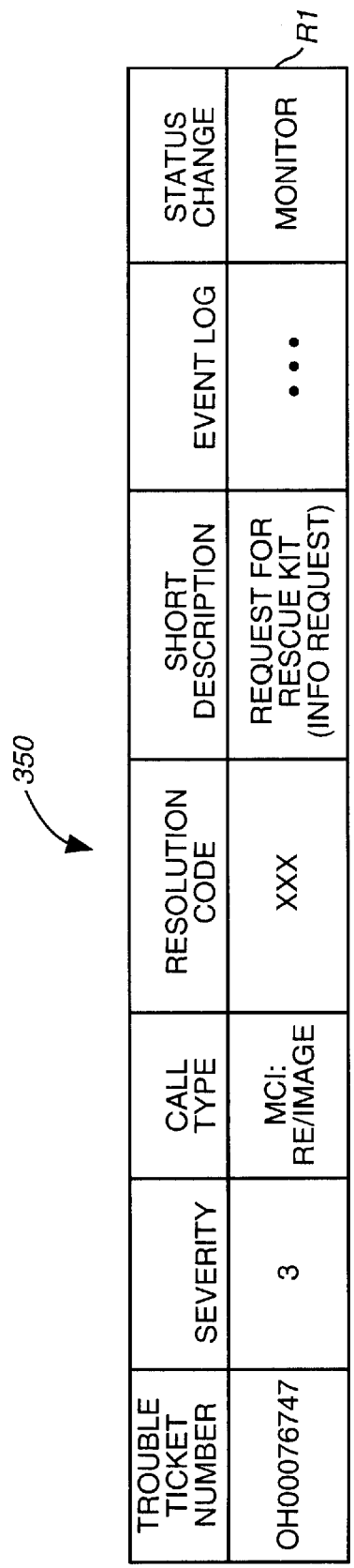
FIG. 3B is an exemplary database containing call center trouble ticket data similar to that shown in the call center trouble ticket depicted in FIG. 2.

The structures mentioned above with regard to FIG. 1 and which are deployed and processed within the present invention are illustrated in FIGS. 2, 3A, and 3B.

Referring now to FIG. 2, depicted therein is an exemplary call center trouble ticket that is used to form the basis of a call tracking database according to a preferred embodiment of the present invention. In particular, call center trouble ticket 200 has a trouble ticket number 202 of OH00076747 which has been identified as relating to a call of severity level 3 (204) (e.g., corresponding to severity levels for a particular call center), a short description 206 identifying the nature of the call being handled relative to trouble ticket 200 (e.g., a request for information for a particular software application or subsystem thereof, etc.), an event log 208 containing notes recorded by call center personnel, and a status indicator 210. Other and/or additional data may be included within a call center trouble ticket; thus the present invention is not to limited by the data shown in trouble ticket 200 or discussed herein.

The recordation and storage of call center trouble tickets, like trouble ticket 200, will be done within a computer system and, in particular, within a database for call center trouble ticket data records in a conventional way. Such trouble tickets and the systems used to record and store the same in modern call centers will be immediately understood by those skilled in the art.

Referring now to FIG. 3A, depicted therein is a block diagram of a computing platform configured to perform call center trouble ticket data analysis according to a preferred embodiment of the present invention. Computing system 300 may be one similar or like a personal computer system such as one manufactured by DELL COMPUTER, INC.. Such a personal computing system may be configured to operate in accordance with the WINDOWS™ operating system which is manufactured and marketed by MICROSOFT CORPORATION.

Computing system 300 includes an input/output (I/O) subsystem 302, a processor arrangement 3o4 including one or more microprocessors or other computing elements, and a data storage subsystem 306. Call center trouble ticket data (of the type discussed below with regard to FIG. 3B) is input to computing system 300 via I/O subsystem 302, for processing by processor arrangement 304 in conjunction with data storage sub-system 306.

I/O subsystem 302 of computing system 300 may also include a host of input and output peripherals. For example, I/O subsystem may include a printing device (e.g., a laser printer device, an ink-jet printer, etc.) (not shown) that is configured to produce printed output such as reports, charts, graphs, etc.. Such a printing device produces graphical output, such as a pie chart or other chart, representative of numerical data (e.g., a pie chart print-out, a linegraph print-out, a bar-chart print-out, etc.). Additionally, I/O subsystem may include other devices such as multi-media devices like microphones, scanners, speakers, CD and DVD players, etc.. Such input and output devices will be immediately understood by those skilled in the art.

Referring now to FIG. 3B, depicted therein is an exemplary database structure containing call center trouble ticket data similar to that shown in the call center trouble ticket depicted in FIG. 2. In particular, data structure 350 may be implemented as a relational database table or other database structure such as a delimited text file, or any other data structure that suits particular design requirements. Data structure 350 is shown to include columns and rows which correspond to particular data fields and data entries, respectively. A row of data identified as R1 includes data directly corresponding to trouble ticket 200 (FIG. 2). For example, row R1 corresponds to trouble ticket number OH00076747 (e.g.. a request for information).

Data structure 350 may be propagated with data entries corresponding to call center trouble tickets (like or similar to that shown in call center trouble ticket 200) for the purpose of forming part of an automated spread sheet as will be further set out below. Alternatively, a data structure, like data structure 350, may be generated automatically. The data structure is stored in a database by systems within a call center and then sent to and input by computing system 300 as a complete data file which may be imported into other data files such as spreadsheet files, etc. It's important to note that data structure 350 is merely exemplary and does not limit the nature or structure of a data source that may be used during analysis operations in accordance with the present invention.

Operational Aspects of the Present Invention

Figure 3C:
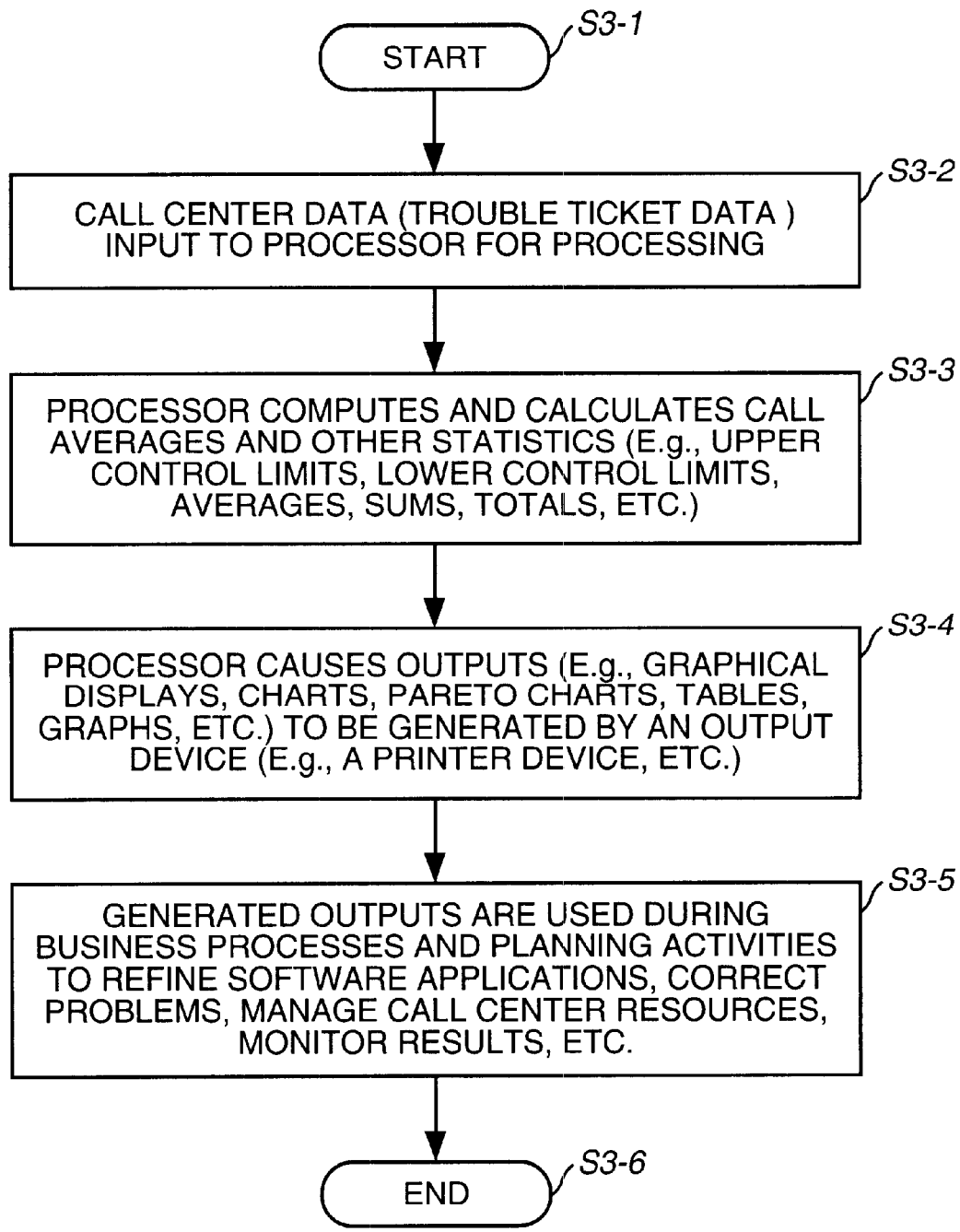
FIG. 3C is a flowchart that illustrates a method for performing call center trouble ticket data analysis to manage a software system according to a preferred embodiment of the present invention.

The structures described above in regard to FIGS. 2, 3A, and 3B are configured to operate together to facilitate management of a software system via analysis of call center trouble ticket data. Exemplary operations to bring about such analysis are depicted in FIG. 3C, to which reference is now made. Regarding FIG. 3C, depicted therein is a flow chart that illustrates a general method for performing call center trouble ticket data analysis to manage a software system according to a preferred embodiment of the present invention.

Processing starts at step S3-1 and immediately proceeds to S3-2. At step S3-2, call center trouble ticket data is input into a processing system such as computing system 300. Processing proceeds to step S3-3 where a processor arrangement (e.g., processor arrangement 304) computes call averages and other statistics including upper control limit call volumes, lower control limit call volumes, and average call volumes over relative periods of time. Such calculations are further discussed below with regard to FIG. 5.

Next, at step S3-4, processor arrangement 304 causes outputs (e.g., graphical displays, charts, Pareto charts, tables, etc.,) to be generated by an output device such as a laser printer, etc.

Next, at step S3-5, generated outputs may be used during business processes to refine software applications, correct problems, monitor corresponding results, etc.

Processing ends at step S3-6.

Referring now to FIGS. 4A and 4B, depicted therein is an exemplary automated spreadsheet used to actually perform call center trouble ticket data analysis to manage a software system according to a preferred embodiment of the present invention. Many of the operations performed within the spreadsheet depicted in FIGS. 4A and 4B are intended to be carried out within the process illustrated in FIG. 3B and, in particular, at Step S3-3 thereof. The automated spreadsheet depicted in FIGS. 4A and 4B may be implemented using an automatic spreadsheet software application such as the MICROSOFT EXCEL spreadsheet application program which is manufactured and marketed by MICROSOFT CORPORATION.

Automated spreadsheet 400 is a columnar spreadsheet structure that embodies data and formulae to mathematically operate upon and perform what-if analysis related to data entries corresponding to call center trouble ticket data. Accordingly, the data structure implemented and illustrated in FIG. 3B may form part of automated spreadsheet 400. That is, data entries contained within a data structure such as data structure 350 (FIG. 3B) including counts related to records contained within that data structure may be represented as data values within automated spreadsheet 400 and, in particular, as cell values thereof.

Automated spreadsheet 400, among other things, includes, an identifier identifying a software system which is to be monitored through use of call center trouble ticket data. In automated spreadsheet 400, that software system is identified at label 402 as "Secure ID." Software system "Secure ID" includes subsystems about which call center trouble ticket data may be collected and processed within automated spreadsheet 400. Call center trouble tickets and corresponding data may be collected in regard to such subsystems as being related to trouble ticket categories 404. Corresponding monthly totals related to call center trouble tickets are calculated based on daily input values for each category or subsystem of software system Secure ID. A total call center trouble ticket count cell 406 totals all trouble tickets over a given period of time (e.g., weekdays for the month of August 1997). A daily total 408 (e.g., sum) is computed across all categories for each particular day of a given period of time (e.g, the month of August 1997). A particular day's count 410 of call center trouble tickets relative to each monitored category is input from streams of data collected from call center systems as described above with regard to FIG. 1.

A data sort and update operation button 412 has been included within automated spreadsheet 400 to provide a user-friendly way to cause appropriate computations, calculations, and call center trouble ticket data analysis to occur based upon up-to-date data entries as included within the particular cells of automated spreadsheet 400 (e.g., cell 410).

Referring now to FIG. 5, depicted therein is an automated spreadsheet that is automatically generated by the automated spreadsheet depicted in FIGS. 4A and 4B. In particular, automated spreadsheet 500 is a data summary spreadsheet reflecting the data entries found in automated spreadsheet 400 (FIGS. 4A and 4B) (e.g., for the month of August 1997). Automated spreadsheet 500 includes, among other things, an average number of calls cell, a percentage of users related to daily call amounts in column 504, corresponding daily call center trouble ticket report numbers and respective percentages in columns 506. The percentages identified in the last row of automated spreadsheet 500 represent the number of calls relative to a total amount of 285 call center trouble tickets. That is, for example, "info 'information' request" related calls like those which correspond to call center trouble ticket 200 (FIG. 2) represent 42% of all calls received during the month of August 1997 related to the Secure ID software application.

In addition to the data values discussed above, automated spreadsheet 500 includes a data analysis block 508. Analysis block 508 includes: data relative to the number of users of the secure ID software system (e.g., 6000 users); an upper control limit 510 corresponding to a calculated upper limit number of calls which expected to may be handled and processed by a call center relative to the call data contained and summarized within automated spreadsheet 500; and a lower control limit 512 corresponding to a calculated lower limit number of calls that may be handled by a call center relative to the data contained in automated spreadsheet 500.

The calculation of call center trouble ticket averages is performed by standard formulas executing statistical processes as is well known in the art.

The upper control limit (UCL) 510 is an upper limit number of calls which may be expected during a particular period of time. In other words, a responsible call center should reasonably expect no more than the UCL number of calls during a particular period (e.g., on a particular day, over a given month, etc.). An UCL may be calculated in accordance with the present invention by sampling techniques which are well known in the art.

The lower control limit (LCL) 512 is a lower limit number of calls which may be expected during a particular period of time. In other words, a responsible call center should reasonably expect no less than the LCL number of calls during a particular period (e.g., on a particularday, over a given month, etc.). The calculated LCL may be calculated in accordance with the present invention by sampling techniques which are well known in the art.

Once call center trouble ticket data is input and processed in accordance with the automated spreadsheets depicted within FIGS. 4A, 4B and 5, the same is processed to produce corresponding average call numbers on daily and monthly bases, and upper and lower control limits as described above. As such, corresponding outputs may be generated by a spreadsheet tool that is used to implement automated spreadsheets 400 & 500 (e.g, via reporting and charting functionality associated with the MICROSOFT EXCEL spreadsheet application, etc.).

Figure 6:
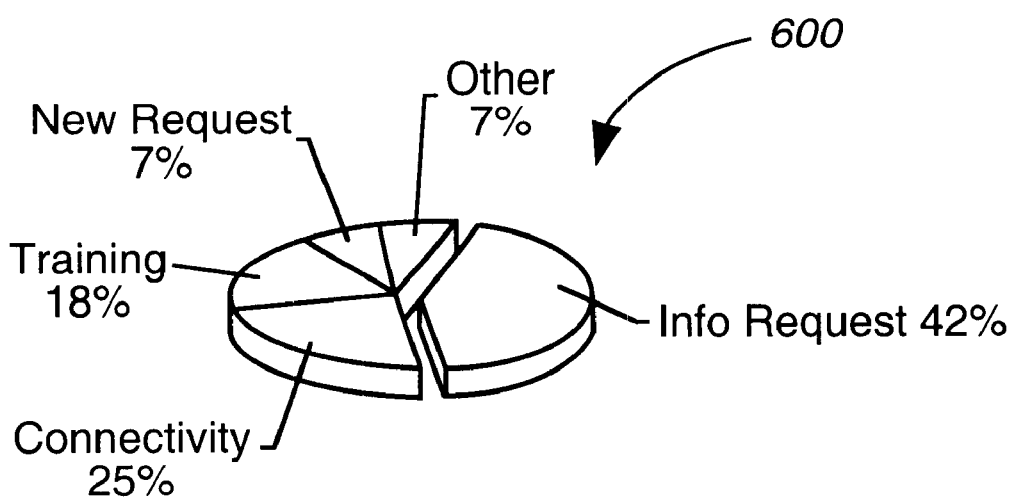
FIG. 6 is an exemplary output chart that is used to graphically depict an analysis of call center trouble ticket data according to a preferred embodiment of the present invention.

Referring now to FIG. 6, depicted therein is an exemplary output chart (e.g., a pie chart) that is used to graphically depict an analysis of call center trouble ticket data according to a preferred embodiment of the present invention. In particular, pie chart 600 includes a graphic representation of the call center percentages identified in FIG. 5 relative to particular subsystems and monitoring approaches related thereto for the software system known as Secure ID. For example, "info request" type calls related to the Secure ID software system constituted 42% of all calls handled by the responsible call center. As such, pie chart 600 may be used during business processes to concisely and graphically depict the amount of calls being handled for a particular subsystem of a larger software system such as the Secure ID system. Business personnel will be able to review pie chart 600 to quickly learn that the call center that is operated to support the Secure ID software system is handling a larger percentage of calls and generating corresponding call center trouble tickets for "info requests." Furthermore, pie chart 600 may be used during business planning and resource allocation activities to illustrate areas of software system improvement and personnel management so that the secure ID software system is properly managed, supported, and refined.

Figure 7:
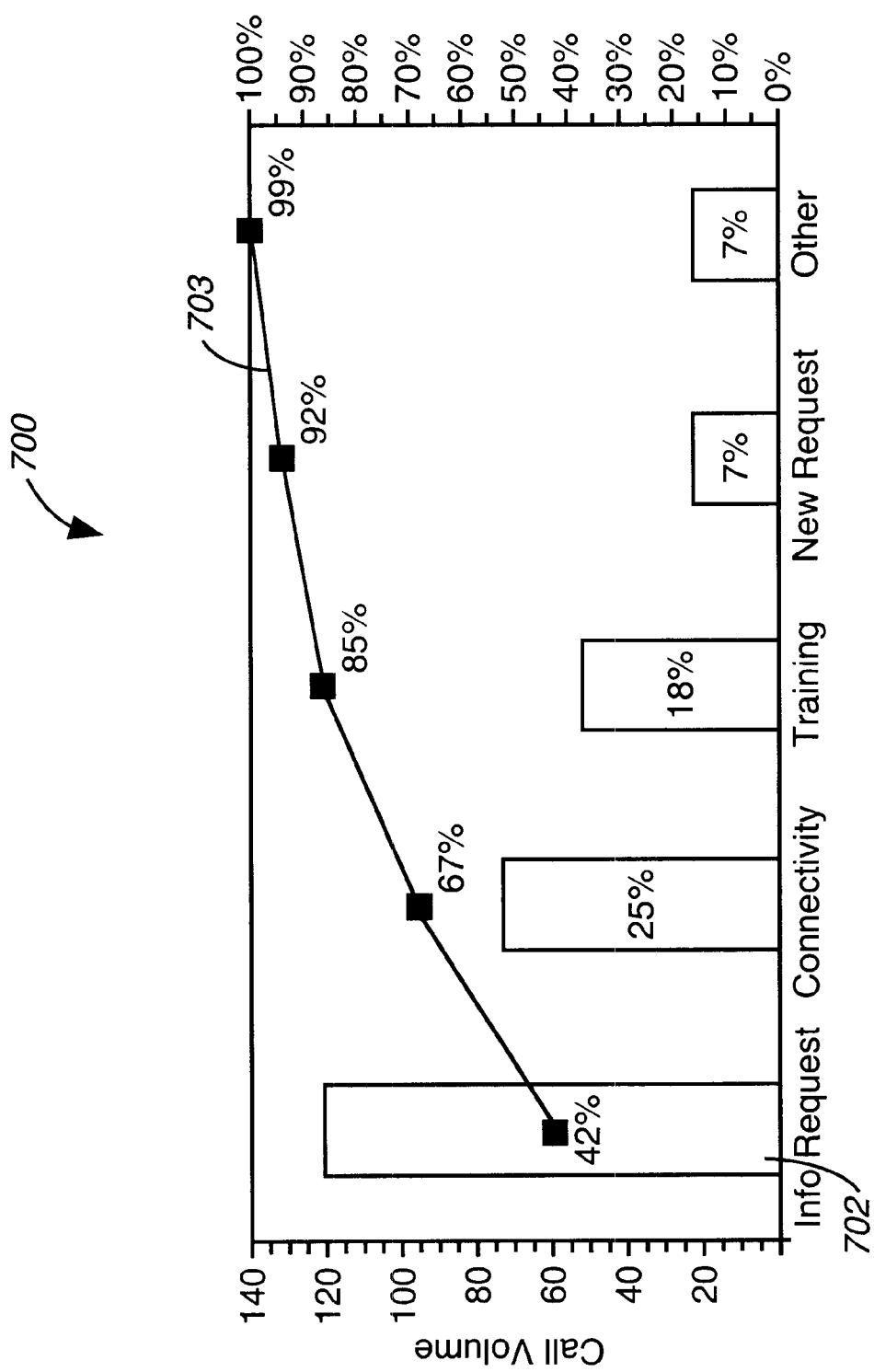
FIG. 7 is an exemplary Pareto-type output chart that is used to graphically depict an analysis of call center trouble ticket data according to another preferred embodiment of the present invention.

Referring now to FIG. 7, depicted therein is an exemplary Pareto type output chart that is used to graphically depict an analysis of call center trouble ticket data according to another preferred embodiment of the present invention. In particular, call center trouble ticket categories such as info request, connectivity, training, new requests, and other types of calls, are listed across the X-axis of the chart, and call volume is listed vertically along the Y-axis. Chart 700 is intended to graphically depict the relative percentages of call center trouble ticket reports for particular software subsystems of the Secure ID software system. Chart 700 is generated in accordance with the automated spreadsheets depicted in FIGS. 4A, 4B and 5.

As noted above with regard to FIG. 5, info request type call center trouble tickets constitute 42% of all call center trouble tickets for August 1997. Such a percentage is indicated by vertical bar 702. A line graph 703 is projected onto chart 700 and illustrates cumulative percentages corresponding to call center trouble ticket reports processed by the call center supporting the Secure ID software system. While info request type call center trouble tickets constitute 42% of all trouble tickets handled by the responsible call center, such tickets along with connectivity related call center trouble tickets constitute 67% of all calls being handled by the call center supporting the Secure ID software system. Accordingly, as one examines chart 700 from left to right, the cumulative percentages of calls to a particular point from the left constitute the relative percentage identified at the corresponding, identified points along line graph 703. That is, info request related calls and connectivity (e.g., network connectivity, etc.) related calls constitute 67% of all calls handled by the responsible call center. Thus, if problems associated with info requests and connectivity were completely addressed, the responsible call center would realize 67% fewer calls and have a corresponding ability to reduce call resources such as personnel, etc..

Figure 8:
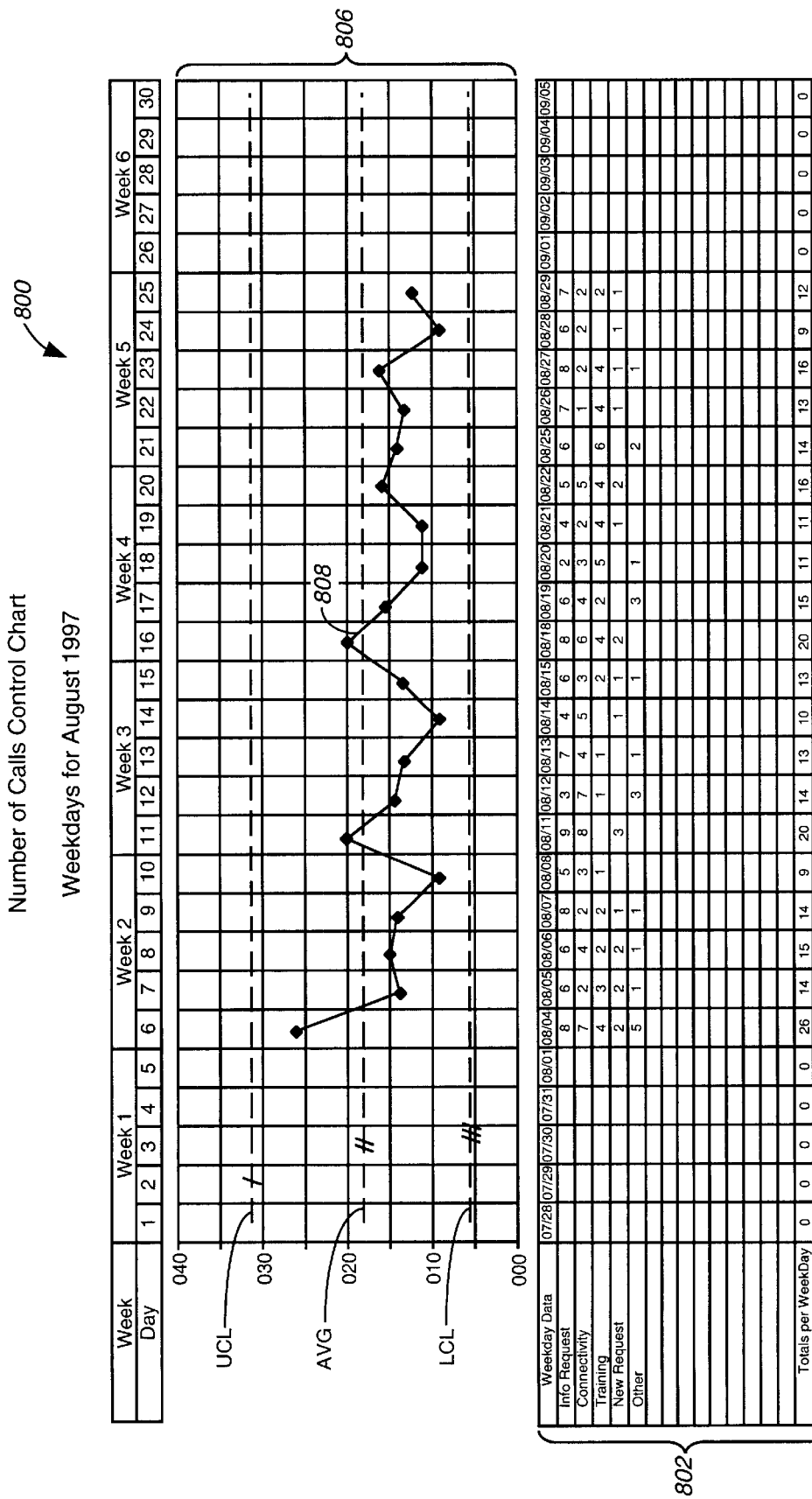
FIG. 8 is an exemplary output chart that is used to graphically depict an analysis of call center trouble ticket data according to another preferred embodiment of the present invention.

Referring now to FIG. 8, depicted therein is an exemplary output chart entitled NUMBER OF CALLS CONTROL CHART. Chart 800 may be used to graphically depict an analysis of call center trouble ticket data according to another preferred embodiment of the present invention. In particular, chart 800 has been implemented within an automated spreadsheet software application such as the MICROSOFT EXCEL software package. Chart 800 summarizes data related to call center trouble tickets generated and collected during weekdays for the month of August 1997. Section 802 of chart 800 summarizes the call center trouble ticket data entries originally depicted in FIGS. 4A and 4B. Section 804 of chart 800 again identifies the upper control limit, the average, the daily call center trouble ticket average, and the lower control limit computed within automated spreadsheet 500 as illustrated in FIG. 5. Dashed lines 805 are intended to correspond to the upper control limit, the daily average, and the lower control limit. The slanted lines crossing the dashed sections of lines 805 are intended to distinguish the graph contained in graph 806 of chart 800.

Graph 806 visually depicts the actual number of calls for given days which correspond to call center trouble tickets generated and stored by a call center responsible for monitoring and supporting the Secure ID software application as described above. Line graph 808 actually depicts the daily call center trouble ticket totals against the upper control limit, the average, and the lower control limit numbers of calls. Accordingly, graph section 806 will allow business personnel to quickly identify whether or not a call center is managing calls and the generation of call center trouble tickets in an appropriate manner based upon business expectations.

Figure 9:
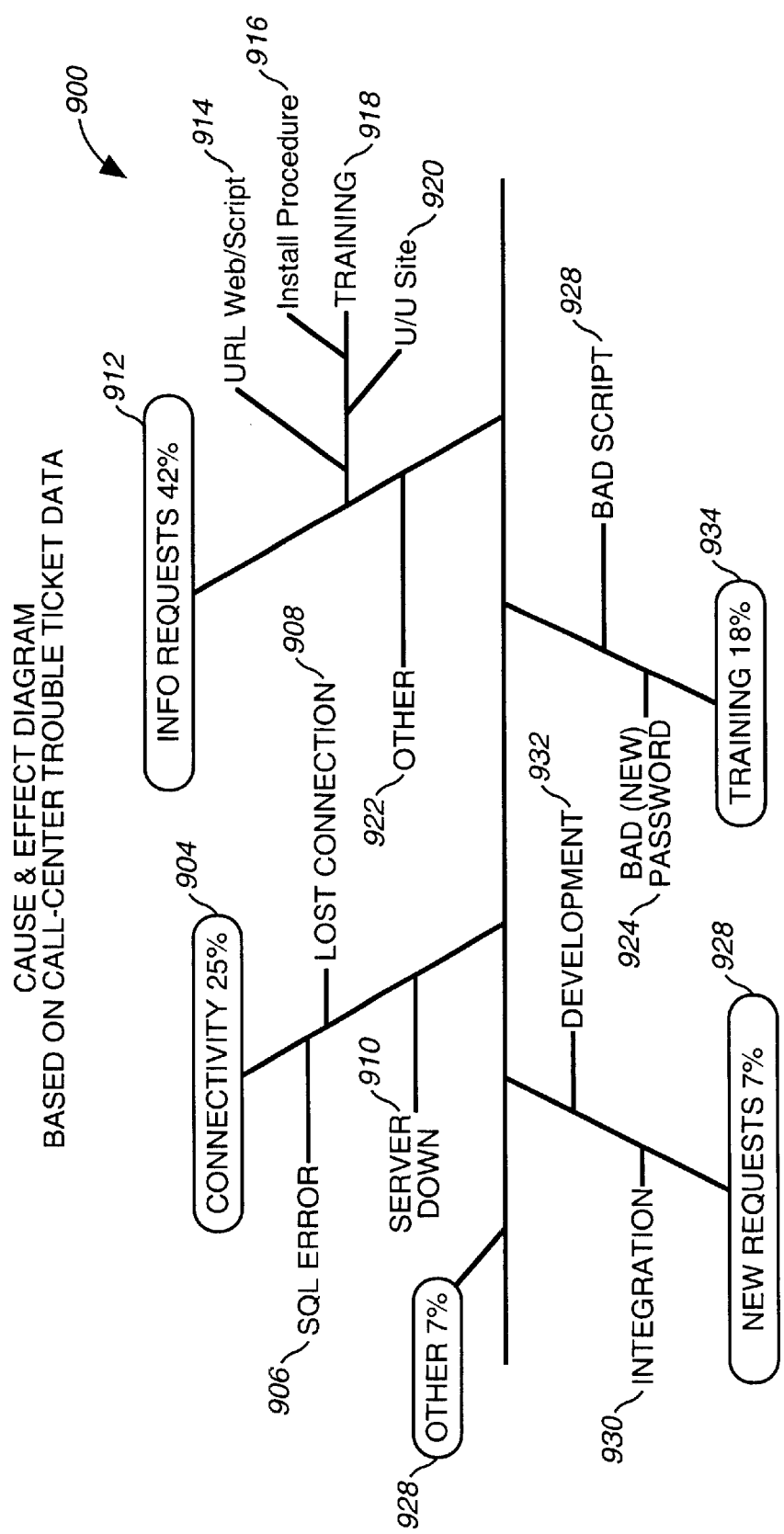
FIG. 9 is a cause and effect diagram based on call center trouble ticket data.

Referring now to FIG. 9, depicted therein is a Cause and Effect Diagram 900. The diagram 900 is based on call center trouble ticket data analyzed in accordance with the systems and processes described above. In particular, the diagram 900 includes a tree that graphically depicts various reasons for problems reported to a call center and a corresponding call center trouble tickets which was generated as a result of such reporting. As depicted, connectivity problems 904 related to the Secure ID software system constitute 25% of all calls received by the responsible call center. Causes for such problems may be identified as SQL (Structured Query Language) errors 906, lost connection problems 908, and faulty equipment such as a server being down 910. Another cause for generating a trouble ticket is a request for information 912. Such requests may relate to URL Web/Script 914, Install Procedures 916, training 918, U/U sites 920 (upgrade and update platform which facilitates access to new and enhanced software packages), and other not listed causes 922. Information requests account for about 42% of trouble tickets. Another cause for generating a trouble ticket is training 934. Training accounts for about 22% of all trouble tickets. Such training may relate to bad passwords 924 and bad script 926. Finally new requests 928 account for about 7% of all trouble tickets. Such new requests may relate to integration 930 and development 932.

Cause & Effect Diagram 900 may be generated by personnel in response to reviewing the charts generated by a software application tool such as the one embodying automated spreadsheets 400 & 500 as illustrated in FIGS. 4A, 4B and 5, respectively.

Thus, having fully described the present invention by way of example with reference to the attached drawings figures, it will be readily appreciated that many changes and modifications may be made to the invention and to any of the exemplary embodiments shown and/or described herein without departing from the spirit or scope of the invention, which is defined in the appended claims.

What is claimed is:

1. An apparatus for managing a software system, comprising:
   a data storage subsystem having a database for storing data related to call center trouble tickets generated in response to corresponding trouble reports related to a telecommunications software system;
   a processor coupled to said data storage subsystem and operative to process said data stored in said database by producing statistics related to said software system and particular subsystems thereof, and to store said statistics in said data storage subsystem, wherein the statistics comprise at least one of call averages, upper control limit call volumes, lower control limit call volumes and average call volumes over relative periods of time; and
   an output subsystem coupled to said processor and said data storage system and operative to automatically retrieve said statistics from said data storage subsystem and to generate at least one report based on said statistics, wherein said at least one report indicates which call center trouble tickets correspond to the at least one report to depict a cause for said trouble report.

2. The system according to claim 1, wherein said statistics include mathematical averages related to a set of call center trouble tickets about which data is stored in said database.

3. The system according to claim 1, wherein said processor is further configured to perform a Pareto analysis related to a set of call center trouble tickets about which data is stored in said database, said Pareto analysis being represented in said at least one report.

4. The system according to claim 1, wherein said output system is operative to produce a graphical representation of said statistics.

5. The system according to claim 4, wherein said graphical representation includes graphic indications related to call center trouble tickets which correspond to said particular subsystems of said software system.

6. The system according to claim 1, wherein said statistics include percentages of all call center trouble tickets corresponding to said particular subsystems of said software system, said percentages being represented in said at least one report.

7. The system according to claim 1, wherein said at least one report is used to manage a lifecycle related to said software system.

8. A method for managing a software system, comprising the steps of:
   collecting data related to call center trouble tickets generated by a call center in response to corresponding trouble reports related to a telecommunications software system;
   processing said data by automatically generating statistics related to said software system and particular subsystems thereof, wherein the statistics comprise at least one of call averages, upper control limit call volumes, lower control limit call volumes and average call volumes over relative periods of time, and
   generating at least one report based on said statistics, wherein said at least one report indicates which call center trouble tickets correspond to the at least one report to depict a cause for said trouble report.

9. The method according to claim 8, wherein said statistics include mathematical averages related to a set of call center trouble tickets generated by said call center.

10. The method according to claim 8, further including the step of performing a Pareto analysis related to a set of call center trouble tickets, said Pareto analysis being represented in said at least one report.

11. The method according to claim 8, wherein said at least one report includes a graphical representation of said statistics.

12. The method according to claim 11, wherein said graphical representation includes graphic indications related to call center trouble tickets which correspond to said particular subsystems of said software system.

13. The method according to claim 8, wherein said statistics include percentages of all call center trouble tickets corresponding to said particular subsystems of said software system, said percentages being represented in said at least one report.

14. The method according to claim 8, further comprising the steps of managing a lifecycle related to said software system based on said at least one report.

15. An apparatus for processing call center trouble ticket data comprising:

a data storage subsystem storing data related to call center trouble tickets generated in response to corresponding trouble reports related to a telecommunications software system and particular subsystems thereof;

a processor coupled to said data storage subsystem and operative to process said data by producing statistics related to said software system and said particular subsystems thereof, and to store said statistics in said data storage subsystem, wherein the statistics comprise at least one of call averages, upper control limit call volumes, lower control limit call volumes and average call volumes over relative periods of time; and an output subsystem coupled to said processor and said data storage system and operative to automatically retrieve said statistics from said data storage subsystem to generate a report based on said statistics, said report including a graphical representation of said statistics and indicating which call center trouble tickets correspond to the at least one report to depict a cause for said trouble report.

16. The system according to claim 15, wherein said statistics include mathematical averages related to a set of call center trouble tickets about which data is stored in said database.

17. The system according to claim 15, wherein said processor is further configured to perform a Pareto analysis related to a set of call center trouble tickets about which data is stored in said data storage subsystem, said Pareto analysis being represented in said report.

18. The system according to claim 15, wherein said output system is operative to produce a graphical representation of said statistics.

19. The system according to claim 18, wherein said graphical representation includes graphic indications related to call center trouble tickets which correspond to said particular subsystems of said software system.

20. The system according to claim 15, wherein said statistics include percentages of all call center trouble tickets which correspond to said particular subsystems of said software system, said percentages being represented in said report.

21. An apparatus for managing a software system, comprising:

a data storage subsystem having a database for storing data related to call center trouble tickets generated in response to corresponding trouble reports related to a software system;

a processor coupled to said data storage subsystem and operative to process said data stored in said database by determining in an automated spreadsheet statistics related to said software system and particular subsystems thereof, and to store said statistics in said data storage subsystem; and an output subsystem coupled to said processor and said data storage system and operative to automatically retrieve said statistics from said data storage subsystem and to generate at least one report base on said statistics.

22. The apparatus of claim 21, wherein the automated spreadsheet includes at least one of an average number of call cells, a percentage of users related to daily call amounts, one or more daily call center trouble ticket report numbers and one or more percentage summaries.

23. The apparatus of claim 21, wherein the call center trouble tickets correspond to trouble reports related to telecommunications trouble.

* * * * *